C. O. YOUNG.
TRANSMISSION GEARING.
APPLICATION FILED AUG. 31, 1910.

984,730.

Patented Feb. 21, 1911.

3 SHEETS—SHEET 1.

INVENTOR
Cleveland O. Young
By Bower Lord & Co.
ATTORNEY

WITNESSES

C. O. YOUNG.
TRANSMISSION GEARING.
APPLICATION FILED AUG. 31, 1910.

984,730.

Patented Feb. 21, 1911.

3 SHEETS—SHEET 2.

Witnesses

Inventor
Cleveland O. Young
by Bonnhardt & Co
Attorneys

C. O. YOUNG.
TRANSMISSION GEARING.
APPLICATION FILED AUG. 31, 1910.
984,730.
Patented Feb. 21, 1911.
3 SHEETS—SHEET 3.
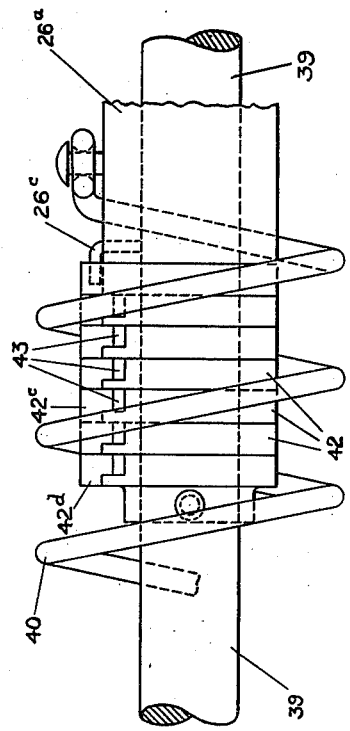
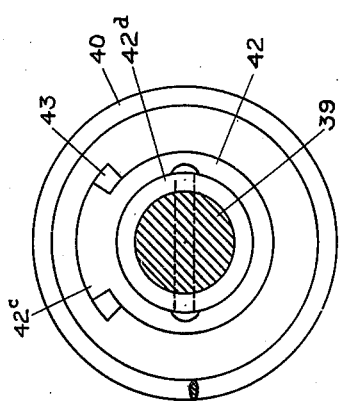
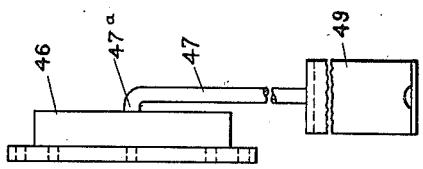
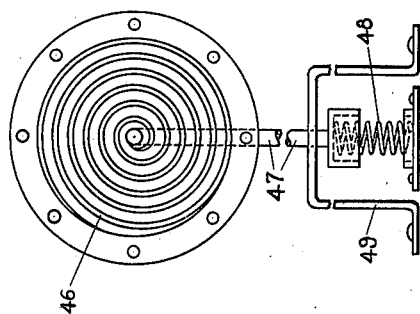
Witnesses
Inventor
Cleveland O. Young
by Bonnhardt & Co
Attorneys

UNITED STATES PATENT OFFICE.

CLEVELAND O. YOUNG, OF CHICAGO, ILLINOIS.

TRANSMISSION-GEARING.

984,730.

Specification of Letters Patent. Patented Feb. 21, 1911.

Application filed August 31, 1910. Serial No. 579,909.

*To all whom it may concern:*

Be it known that I, CLEVELAND O. YOUNG, citizen of the United States, residing at Chicago, in the county of Cook and State of Illinois, have invented certain new and useful Improvements in Transmission-Gearing, of which the following is a specification.

This invention relates to new and useful improvements in transmission gearing of the frictional type, and it is especially adapted for use on automobiles, but capable of other uses, if desired.

The objects of the invention are to provide suitable means to prevent the stripping of gears; to prevent a sudden jerk or jar when either starting or stopping the motor vehicle or other machine; to reduce the number of foot pedals or operating levers, and to eliminate the use of side levers in automobiles.

Figure 1:
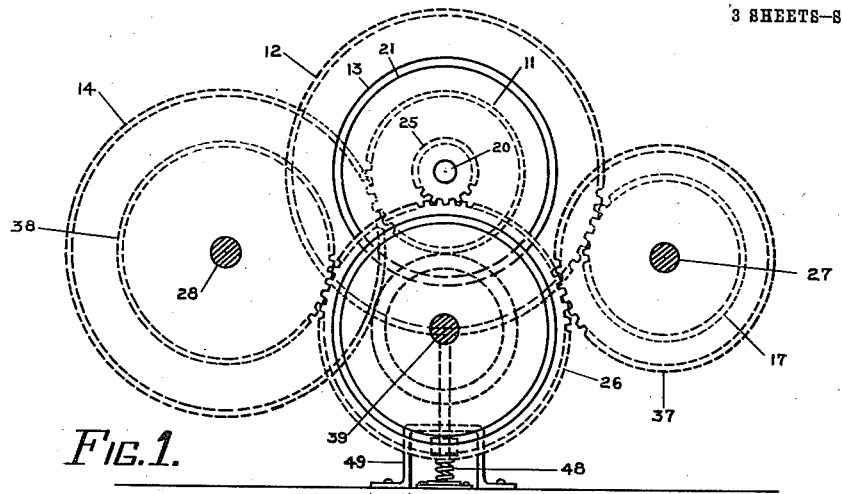
Figure 2:
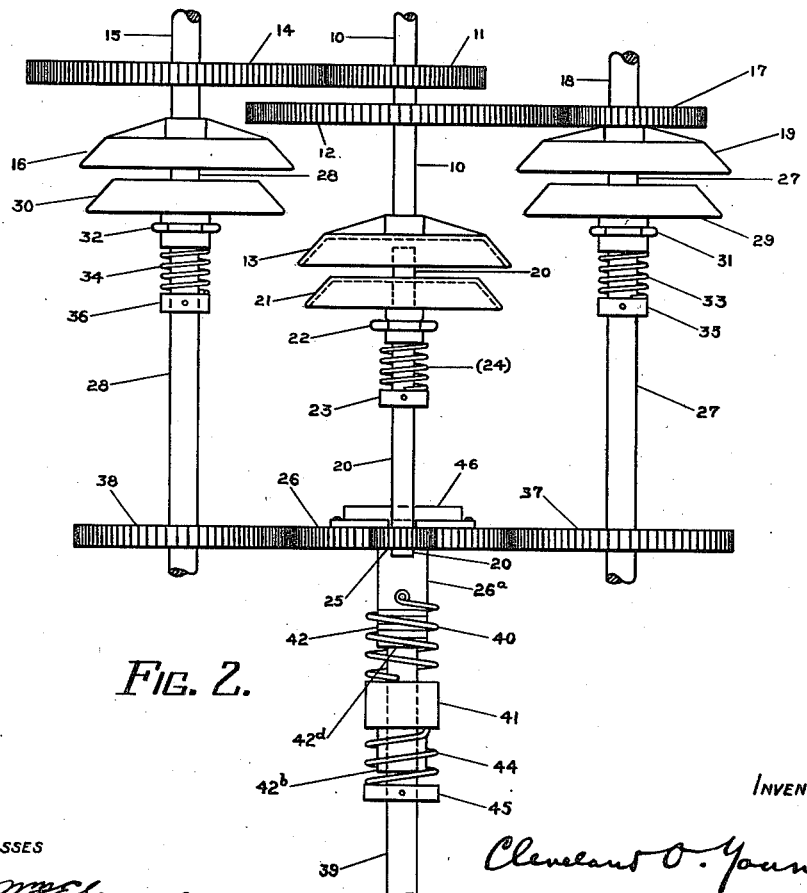
Figure 3:
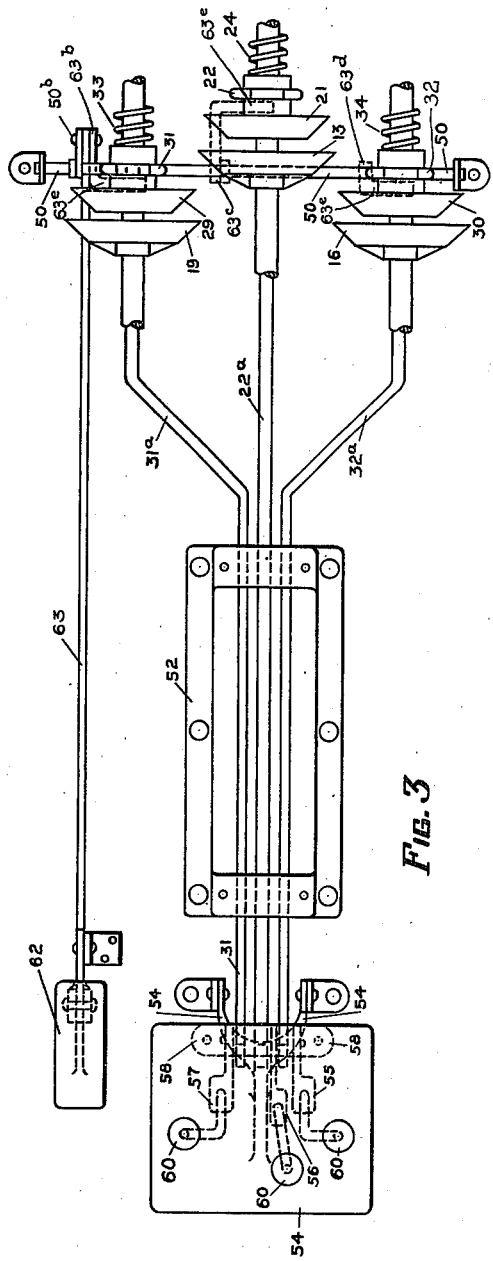
Figure 4:
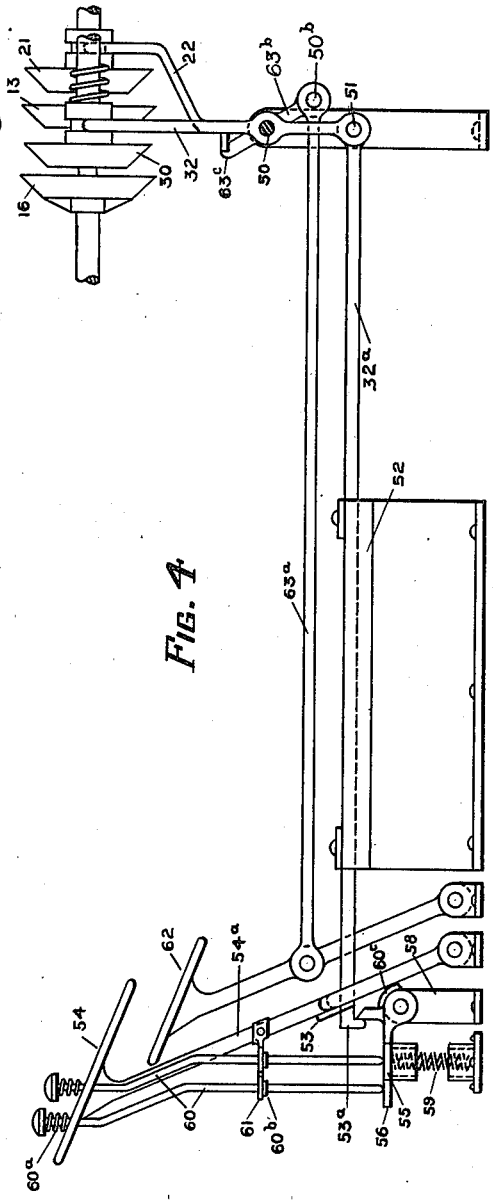

In the accompanying drawings, Figure 1 is an end elevation of assembled parts of the gearing. Fig. 2 is a plan view of the parts shown in Fig. 1. Fig. 3 is a plan showing the operating pedal and connections. Fig. 4 is a side elevation of the parts shown in Fig. 3. Figs. 5 and 6 are side and end elevations of a tension device, forming an element of the gearing. Figs. 7 and 8 are side and end elevations of a cushioning device forming part of the gearing.

Referring specifically to the drawings, 10 indicates a motor or driving shaft on which is fixed a small gear 11, a large gear 12, and a member 13 of a friction clutch, which latter may be of any ordinary or desired type, and is secured near one end of the shaft. The gear 11 engages a large gear 14 fixed on a shaft 15 which also carries the member 16 of a friction clutch. The gear 12 engages a gear 17 fixed on shaft 18, which carries a member 19 of a friction clutch, which may be identical in design with the members 13 and 16. The shafts 15 and 18 are located on opposite sides of the driving shaft 10.

An intermediate or jack shaft 20 is disposed in line with the shaft 10, and carries the member 21 of a clutch which is engageable with the member 13. The hub of the sliding member 21 is grooved to receive the fork of an operating lever 22, and between said hub and the fixed collar 23 a coiled spring 24 is retained in compression. A small gear 25 is secured to the opposite end of the shaft 20, and engages a gear 26. The shafts 27 and 28 carry members 29 and 30, respectively, of friction clutches with grooved hubs to receive the forks of operating levers 31 and 32 with coiled springs 33 and 34 retained between the said hubs and fixed collars 35 and 36 respectively on said shafts. These shafts 27 and 28 each carry a gear 37 and 38 which engage with the gear 26, the latter being rotatably mounted on a shaft 39 which is the driven shaft and which will be connected to the driven mechanism in any suitable manner.

A series of loose collars 42 are retained on the shaft 39, the first being held adjacent to the hub 26$^a$ of the gear 26, and the others being rotatable adjacent to each other between said hub and a collar 42$^d$ fixed on said shaft 39. Each loose collar 42 is provided with a lock 43 which overlaps the adjacent collar and is arranged to engage a projection 42$^c$ thereon, as hereinafter explained. One end of a coiled spring 40 is fastened to the hub 26$^a$, and extends around the collars 42, and is fastened at its other end to a collar 41 loose on the shaft 39. Another spring 44, wound in reverse of spring 40, is connected to collar 41 at one end and to a fixed collar 45, on the shaft 39, at the other end. Loose collars 42$^b$ are retained on the shaft 39 between the collars 41 and 45.

A cushioning or frictional device is provided at the end of shaft 39, as seen best in Figs. 7 and 8. It consists of a spirally grooved member 46 secured to the gear 26, a rod 47 having a bent or projecting end 47$^a$ which engages in the groove, a coiled spring 48 retained under the lower end of the rod, and a guide piece 49 in which the rod works up and down.

The transmission gearing provides for first or low speed, a second or high speed, and a reverse action. The engagement of the left hand clutch members 16 and 30, illustrated in Fig. 2, will produce first or low speed when the motor is in operation, the gear 14 being relatively larger than the gear 17; the engagement of the right hand clutch 19 and 29 will produce high or second speed. The engagement of the middle clutch 13 and 21 will produce reverse drive under similar conditions. The engagement of any one of the clutches will accomplish the aforesaid operations, as desired, no shifting of the gears being necessary, and they are always in mesh. Any one of the three operations before mentioned will, through the gearing provided, produce a revolution of the gear 26 which is directly connected with the shock-eliminating mechanism operating between it and the driven shaft 39. The revolution of gear 26 on shaft 39 in starting increases the tension of the spring 40 and reduces its diameter until a certain point is reached when the hub of the gear 26 and the adjacent loose collar 42 will revolve, the hub 26$^a$ being connected to the first collar, as by member 26$^c$. The projection 43 on this collar will in its revolution catch the projection 42$^c$ on the next adjacent collar, and so on, the action increasing the tension of the spring 40 and the projections being set, for example, so that three-fourths of a revolution are necessary to cause one collar to take up the next, until finally all the collars are engaged, the load being gradually taken up in opposition to the spring 40.

It will be appreciated that when the machine is stopped the sudden recoil of the springs would produce a shock. To prevent this, the device illustrated especially in Figs. 7 and 8 is provided. In starting the gearing, the piece 47 will be in the position shown; and as the revolution of the spirally grooved member 46 continues in consequence of the turn of the gear 26 to which it is fastened, the member 47 will be carried upwardly by the spiral groove until it reaches the end of the groove, at the top, where it will remain until the machine is stopped. The recoil of the spring 40 will then produce a reverse movement of the gear 26 and the member 46, and as the piece 47 is forced downwardly friction between said piece and the wall of the groove is produced, which tends to overcome the recoil of the spring 40 and prevent a sudden jerk or jar, and this action is assisted by the compression of the spring 48, which assists said movement and increases the friction between the members 46 and 47. The spring 44 also assists in preventing too quick recoil, inasmuch as it is wound and also acts in opposition to spring 40, being connected thereto by the loose collar 41. When the reverse clutch 13, 21, is engaged the gear 26 is also revolved and the same operation is produced as with the first speed operation.

The clutches are operated by the devices shown especially in Figs. 3 and 4. The forked ends of the levers 22, 31 and 32 are of the ordinary type, said levers being mounted on a shaft 50 and connected by pivots 51 to links 22$^a$, 31$^a$ and 32$^a$ which slide in suitable guides in a guide piece 52. The end of each of said rods is hooked, as indicated at 53$^a$ and has projections 53 in contact with the stem 54$^a$ of the pedal 54, suitable recesses in said stem being provided for the rods. The hooks 53$^a$ at the ends of the rods are engaged respectively with pivoted dogs 55, 56 and 57, mounted on brackets 58 and held in position by springs 59 pressing thereunder. Each dog is operated by a rod 60 which extends through holes in the pedal 54 and through a guide 61 on the stem of the pedal, each trip-rod having a spring 60$^a$ normally holding it in raised position. A stop 60$^c$ limits the lift. A separate trip rod is provided for each dog, and a separate dog for each connecting rod. The springs 24, 33, and 34, respectively, tend to engage the respective clutches, and this action is normally resisted by the dogs 55, 56 and 57, the upright arms of which engage the hooks 53$^a$ and the horizontal arms of which press upwardly against the trip rods 60, which are stopped by collars 60$^b$ contacting against the guides 61. To release any lever, and thus permit the engagement of a selected clutch, the trip rod which corresponds to said clutch is pressed down until the corresponding dog is disengaged from the hook at the end of the connecting rod. Then the force of the clutch spring will throw the clutch members together, and said clutch will remain in engagement until the pedal 54 is pressed forwardly to an extent sufficient to reëngage the hook 53$^a$, which was released, with the upright member of the dog, said movement acting to disengage the clutch and stop the drive until the same or another dog is again released by operation of the trip-rod 60. The pressure on the pedal 54 will, to a certain extent, control the engagement of the selected clutch, since the pressure thereon will tend to disengage the clutch. It will thus be seen that the engagement of any clutch may be effected and controlled by operation of the lever 54 and the associated trip-rods 60, one foot of the operator being all that is necessary for this purpose.

For an emergency I provide a pedal 62 connected by rod 63$^a$ and pivot 50$^b$ to a lever 63$^b$ which is fixed on the shaft 50. Said shaft also carries levers 63$^c$ and 63$^d$, and said levers 63$^b$, 63$^c$ and 63$^d$ are bent as indicated at 63$^e$ to engage the respective operating levers above described; and any clutch that is engaged at any time may be disengaged by pressure on the pedal 62, the projections 63$^e$ extending across in front of the respective levers 31, 22 and 32, to throw the same and disengage the clutches corresponding thereto.

I claim:

1. The combination of driving and driven shafts, a plurality of intermediate shafts, change speed and reverse gearing between the driving shaft and the respective intermediate shafts, said gearing including fast and loose clutch members on each intermediate shaft, gearing between each intermediate shaft and the driven shaft, a spring tending to engage each clutch, and means acting in opposition to the springs to independently disengage each clutch.

2. The combination of a shaft, a wheel loose thereon, a series of collars on the shaft, one of said collars being fixed and the others being loose and having projections engageable successively with each other when the wheel is turned; another loose collar on the shaft, a spring coiled around the shaft and connected at its opposite ends to the wheel and said loose collar, and another spring coiled in reverse direction around the shaft and connected to the fixed collar and the last mentioned loose collar.

3. The combination of a shaft, a wheel loose thereon, a spring connection between the wheel and shaft, and a cushioning device operatively connected to the wheel, to absorb recoil of the spring.

4. The combination of a shaft, a wheel loose thereon, a spring connection between the same, and a cushioning device to absorb recoil of the spring, comprising a spirally-grooved member fastened to the wheel, and a spring-pressed member having a projection in the groove, frictionally engaging therein.

5. The combination with selective gear elements, of a controlling device comprising shifting levers connected respectively to the selective elements, springs tending to shift said elements o engagement respectively, dogs having an operative connection to said levers and adapted to normally hold the said elements in disengagement, and means to release and reconnect said dogs respectively.

6. The combination with selective gear elements, of a controlling device comprising shifting levers connected respectively to the selective gear elements, springs tending to engage said elements, dogs having an operative connection to said levers and adapted to normally hold the said elements in disengagement, an operating lever, and a set of trips carried by the lever and coöperating with the dogs respectively to release the same selectively, the operating lever having a connection to the shifting levers to restore the same to connection with the dogs.

7. The combination with selective gear elements, of a controlling device comprising shifting levers connected respectively to the selective gear elements, springs tending to engage said elements, dogs having an operative connection to said levers and adapted to normally hold the said elements in disengagement, an operating pedal, and a set of trips carried by the pedal in position for operation thereon and projecting to engage and release the dogs respectively, the pedal having also an operative connection to the shifting levers to produce disengagement of the gear elements and restore the connection of the shifting levers and the dogs.

8. The combination of selective speed gearing including a plurality of clutches, springs tending to engage the members of said clutches, rods operatively connected to the movable clutch-members, dogs engaging the rods and normally holding the clutches open, a lever operatively connected to all the rods to move the same to engagement with the dogs and open the clutches, and means carried by the lever to selectively disengage any dog from the corresponding rod, to permit the spring to close the appropriate clutch.

In testimony whereof, I affix my signature in presence of two witnesses.

CLEVELAND O. YOUNG.

Witnesses:
NELLIE FELTSKOG,
H. G. BATCHELOR.